United States Patent
Xu et al.

(10) Patent No.: US 9,379,720 B1
(45) Date of Patent: Jun. 28, 2016

(54) CLOCK RECOVERY CIRCUIT

(71) Applicant: Xilinx, Inc., San Jose, CA (US)

(72) Inventors: Yu Xu, Palo Alto, CA (US); Santiago G. Asuncion, San Ramon, CA (US); Tianqi Tang, San Jose, CA (US); Toan Pham, San Jose, CA (US); Kun-Yung Chang, Los Altos Hills, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/715,280

(22) Filed: May 18, 2015

(51) Int. Cl.
*H03D 3/24* (2006.01)
*H03L 7/087* (2006.01)
*H04L 7/04* (2006.01)

(52) U.S. Cl.
CPC . *H03L 7/087* (2013.01); *H04L 7/04* (2013.01)

(58) Field of Classification Search
CPC .................................................... H04L 7/0331
USPC ................................................... 375/375
See application file for complete search history.

*Primary Examiner* — Lihong Yu
(74) *Attorney, Agent, or Firm* — LeRoy D. Maunu; Frederick Hsu

(57) ABSTRACT

Clock data recovery can be accomplished using a phase path circuit that is configured to receive a data signal and a clock signal. A phase detection circuit detects phase differences between the data signal and a plurality of clock signals and generates a phase adjustment signal based upon a majority voting of the detected phase differences. Speculative calculation circuits generate speculative phase selection signals. Selection circuits select, in response to the phase adjustment signal, from speculative phase selection signals to provide outputs of the phase path circuit.

17 Claims, 7 Drawing Sheets

CLOCK RECOVERY CIRCUIT

TECHNICAL FIELD

The disclosure generally relates to clock and data recovery circuits, and more particularly to circuits for a circuit path configured to recover a clock from received data using speculative calculations.

BACKGROUND

Clock and data recovery (CDR) circuits can be used with various communication protocols to generate a synchronized clock from received data. CDR circuits can allow for high speed data streams to be sent without a separate, dedicated, clock signal. For instance, a CDR circuit can be configured to infer clock timings (phase and frequency) from received data in the analog realm and make adjustments directly to a phase locked loop (PLL) or a delay locked loop (DLL). Certain types of CDR circuits can be configured to be based upon phase interpolation (PI) in which a set of reference clock signals are used to produce different phases. The CDR circuit selects the appropriate clock phases based upon the received data. There are a variety of different applications that can use CDR circuits including, but not limited to, programmable logic devices (PLDs).

PLDs are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are often programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

SUMMARY

Implementations are directed toward a clock data recovery device that includes a phase path circuit that is configured to receive a data signal and a clock signal. The phase path circuit includes a phase detection circuit that is configured to detect phase differences between the data signal and a plurality of clock signals and to generate a phase adjustment signal based upon a majority voting of the detected phase differences. A first speculative calculation circuit is configured to generate a first plurality of speculative phase selection signals for different potential values of the phase adjustment signal. A second speculative calculation circuit is configured to generate a second plurality of speculative phase selection signals that are offset from the first plurality of speculative phase selection signals and that are for the different potential values of the phase adjustment signal. A first selection circuit is configured to select, in response to the phase adjustment signal, one of the first plurality of speculative phase selection signals as a first output of the phase path circuit. A second selection circuit is configured to select, in response to the phase adjustment signal, one of the second plurality of speculative phase selection signals as a second output of the phase path circuit.

Certain implementations are directed toward a method for clock data recovery. A plurality of clock signals are generated, where each have a different relative phase offset. A data signal is received by a clock data recover circuit. A phase detection circuit is used to detect phase differences between the data signal and the plurality of clock signals. Using the phase detection circuit, a phase adjustment signal is generated based upon a majority voting of the detected phase differences. Using a first speculative calculation circuit, a first plurality of speculative phase selection signals are generated for different potential values of the phase adjustment signal. Using a second speculative calculation circuit, a second plurality of speculative phase selection signals a regenerated with an offset from the first plurality of speculative phase selection signals and that are for the different potential values of the phase adjustment signal. Using a first selection circuit and in response to the phase adjustment signal, one of the first plurality of speculative phase selection signals is selected as a first output of a phase path circuit. Using a second selection circuit and in response to the phase adjustment signal, one of the second plurality of speculative phase selection signals is selected as a second output of the phase path circuit.

According to various implementations a system includes a first clock data recovery circuit that includes a phase path circuit that is configured to receive a data signal and a clock signal. The phase path circuit includes a phase detection circuit configured to detect phase differences between the data signal and a plurality of clock signals and to generate a phase adjustment signal based upon a majority voting of the detected phase differences. A first speculative calculation circuit is configured to generate a first plurality of speculative phase selection signals for different potential values of the phase adjustment signal. A second speculative calculation circuit is configured to generate a second plurality of speculative phase selection signals that are offset from the first plurality of speculative phase selection signals and that are for the different potential values of the phase adjustment signal. A first selection circuit is configured to select, in response to the phase adjustment signal, one of the first plurality of speculative phase selection signals as a first output of the phase path circuit. A second selection circuit is configured to select, in response to the phase adjustment signal, one of the second plurality of speculative phase selection signals as a second output of the phase path circuit. A second clock data recovery circuit has a latency that exceeds the first clock data recovery circuit. A clock data recovery circuit selection circuit is configured to select between the first clock data recovery circuit and the second clock data recovery circuit.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
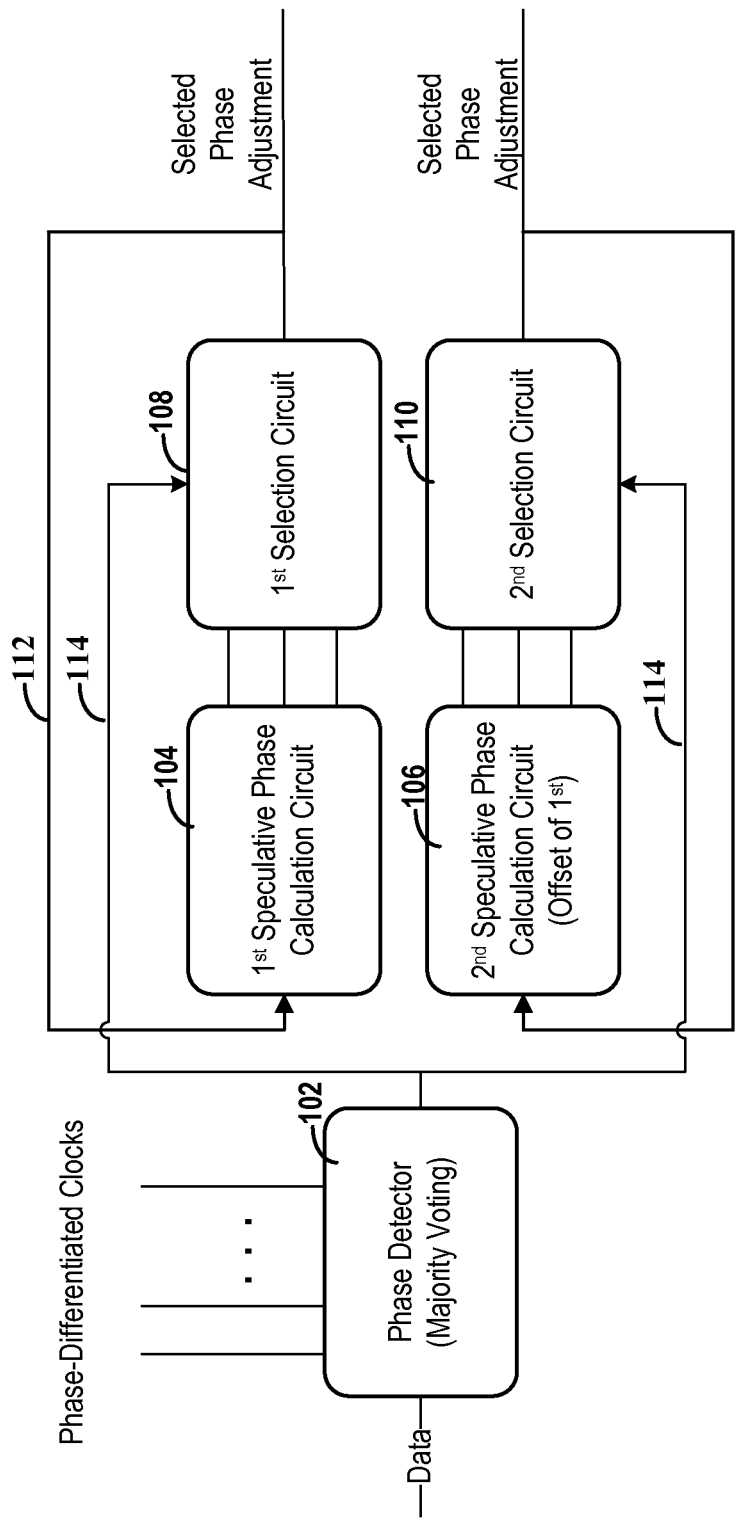
FIG. 1 depicts a block diagram for a CDR circuit with both speculative and parallel computations, consistent with implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Clock and data recovery (CDR) circuits can be used with various communication protocols to generate a synchronized clock from received data. CDR circuits can allow for high speed data streams to be sent without a separate, dedicated, clock signal. Phase selection data can be used to control a clock generation circuit. In particular implementations, the phase selection signals can be phase-interpolation (PI) codes that are used to select different phases in order to synchronize the clock with the received data.

Various implementations are directed toward a clock data recovery (CDR) circuit that is configured to provide phase selection signals from received data with less latency than conventional approaches. Depending on data rate and application, each CDR operation cycle can generate a delay that corresponds to the deserialization of the received data. In existing CDR circuits, a complete CDR operation can take multiple cycles (e.g., five or more cycles) to complete. Thus, the CDR total internal delay (latency) can be relatively large, when compared to other components in the system. Aspects of the present disclosure relate to the recognition that CDR delay can have significant impact to system performance.

Consistent with implementations, a reduction in CDR delay can be accomplished by implementing a CDR circuit having a phase path circuit that can include both speculative and parallel computations that can be useful for reducing the delay between the receipt of the data signals and the generation of the phase selection signals (e.g., by performing at least some computation in parallel rather than serially).

Particular implementations are directed toward a CDR circuit that includes a phase path circuit. The phase path circuit (or just "phase path") is configured to receive a data signal and a clock signal. The phase path circuit is configured to provide phase selection signals that indicate what adjustments (if any) to the clock signal will improve the synchronicity between the clock signal and the data signal. Computations that would otherwise be serially accomplished can be carried out in parallel through the use of speculative values for internal computational values of the CDR circuit.

In some implementations, the CDR circuit can additionally include a frequency path circuit that is also configured to provide a clock frequency adjustment to the phase selection signals within the two cycles. As used herein, the term "cycles" is relative to a reference clock used to store intermediate data within the CDR circuit.

Turning now to the figures, FIG. 1 depicts a block diagram for a CDR circuit with both speculative and parallel computations in a phase path, consistent with implementations of the present disclosure. The phase path can include a phase detection circuit 102 that is configured to detect phase differences between the data signal and a plurality of clock signals. The clock signals can have a relative phase offset from one another that is used for phase interpolation (PI). Based upon the detected phase differences between each of the clock signals and the data signal, the phase detection circuit 102 can generate a phase adjustment signal 114. In certain implementations, the phase detection circuit 102 is configured to select the appropriate phase adjustment based upon a majority voting solution in which each of the detected phase differences from the plurality of clock signals is considered (or given a vote) during the generation of the phase adjustment signal 114.

A first speculative calculation circuit 104 can be configured to generate a first plurality of speculative phase selection signals (e.g., PI codes) representing different potential values of the phase adjustment signal 114. For example, the speculative calculation circuit 104 can be configured to perform calculations that use the phase adjustment signal as an input for the calculations. Using speculative values for the phase adjustment signal can allow for these calculations to be carried out at the same time, and in parallel with, the creation of the phase adjustment signal. In particular, the speculative phase selection signals can be generated for different potential phase adjustment values in order to allow for the corresponding calculation to be carried out earlier than if the calculation did not begin until the actual phase adjustment signal 114 was available.

For instance, the calculation performed by the speculative phase calculation circuit 104 can be a function of a corresponding speculative phase change (speculating for potential phase change detections from phase detection circuit 102) and feedback signal 112 that represents the selected phase adjustment signal from previous phase path iterations. The speculative selection signals can be generated before receipt of the actual phase adjustment signal from the phase detection circuit 102 by calculating the phase selection signals based upon possible (speculative) values for the phase adjustment signal. The early generation of the speculative selection signals can be particularly useful for allowing the (speculative) calculation to be carried out before the actual phase adjustment signal is available.

A second speculative calculation circuit 106 can be configured to generate a second plurality of speculative phase selection signals that are for the different potential values of the phase adjustment signal and which are calculated based upon a phase adjustment value from the first speculative calculation circuit 104. In particular, the second speculative calculation circuit 106 can generate a selected phase adjustment signal that is an offset from a phase adjustment signal that was selected from the first speculative calculation circuit 104. These second speculative phase selection signals can also be generated in parallel with the generation of the actual phase adjustment signal 114 from the phase detection circuit 102 and the selection of a phase adjustment signal from the first speculative calculation circuit 104. Using the speculative values in place of the actual adjustment signal, the second speculative calculation circuit 106 can perform the calculations, including an offset value from the first speculative calculation circuit. The appropriate result of the calculations can be selected upon receipt of the actual adjustment signal. Moreover, the second speculative phase selection signals can correspond to the first speculative phase selection signals with a variable offset value.

A first selection circuit 108 can be configured to select, in response to the phase adjustment signal 114, one of the first plurality of speculative phase selection signals as a first output of the phase path circuit. For instance, the first selection circuit 108 can operate as a multiplexor that allows for the selection of a speculative phase selection signal based upon the detected phase differences from the phase detection circuit 102. A second selection circuit 110 can be configured to select, also in response to the phase adjustment signal 114, one of the second plurality of speculative phase selection signals as a second output of the phase path circuit. The selected phase adjustment signals from the selection circuits can then be provided to a clock generation circuit. For example, the selected phase adjustment signals can be PI codes for a PI clock generation circuit.

Consistent with various implementations discussed herein, the use of parallel calculations from speculative values can be particularly useful for reducing CDR circuit delay times relative to the receipt of data and the availability of phase adjustment signals, such as PI codes.

Figure 2:
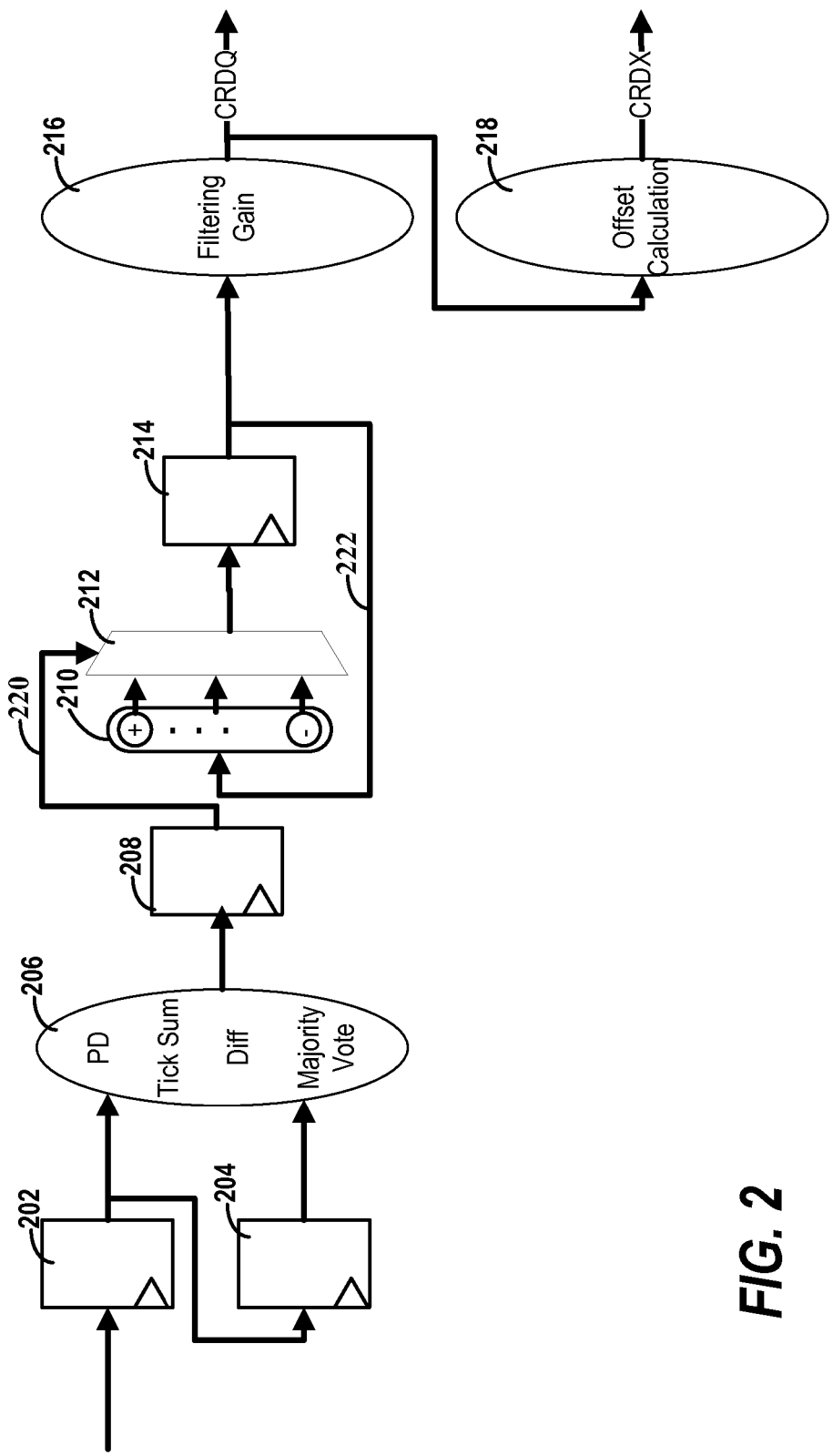
FIG. 2 depicts a block diagram for a CDR circuit with speculative computations, consistent with various implementations.

FIG. 2 depicts a block diagram for a CDR circuit with speculative computations, consistent with various implementations. The block diagram of FIG. 2 is consistent with CDR circuits in one or more existing devices. The phase detection can be implemented using a bang-bang phase detector in which data is received by a set of data registers 202 and 204. A phase detection circuit 206 can be configured to generate a phase adjustment signal 220 using a majority voting solution in which different phase detection values for a plurality of clock signals are used to generate the votes used in the generation of the phase adjustment signal. The majority voting algorithm can include phase detection (PD), a tick sum determination, and a net different determination. The tick sum represents the summation of parallel results from multiple phase detection determinations from parallel data received from the deserializer of the upstream logic block. Due to the nature of the phase detection circuit of the depicted example, three possible results could be generated: increasing/moving-up (+), decreasing/moving-down (−), or no-change/no-move (sometimes also used interchangeable as moving-left, moving-right or no-move). The net difference represents the difference between moving-ups and moving-downs, which indicates the direction of PI code should move statistically. A data register 208 can be used to store the phase adjustment signal.

Consistent with some implementations, a speculative calculation circuit 210 can be configured to generate a plurality of speculative phase selection signals that are for the different potential values of the phase adjustment signal e.g., plus, minus, and no change relative to a prior CDR iteration. The use of potential/speculative values allows for the calculations to be carried out prior to the availability of the phase adjustment signal because the calculations do not need the final/actual phase adjustment signal to begin the calculations, which use speculative values instead. In particular implementations, the speculative calculation circuit 210 can use a feedback signal 222 from a previously calculated (and selected) value as the starting point for the calculation. The feedback signal can be particularly useful for providing a relative adjustment (e.g., an incremental step adjustment from a current position).

A selection circuit 212 can be configured to select, in response to the phase adjustment signal, one of the speculative phase selection signals. For instance, the majority voting algorithm can generate the phase adjustment signal based upon a determined direction of phase shift (if any) from a currently selected phase. The selection circuit 212 can be configured to select a speculative phase selection signal that corresponds to the determined direction (if any). The selected speculative phase selection signal can then be stored in a data register 214. The stored value can be fed back to the speculative calculation circuit 210, and used in subsequent calculations.

In various implementations, filtering and/or gain circuit 216 can be used to further process the selected speculative phase selection signal. The resulting output (CDRQ) can then be used to control the clock generation circuit (e.g., by providing PI codes). Consistent with certain implementations, a second output (CDRX) can be provided with a phase offset from the first output using an offset calculation circuit 218. In certain implementations the default setting has CDRQ leading CDRX, i.e., the data capture phase leads the crossing capture phase by about half the unit interval (UI). CDRQ and CDRX can be the codes used to determine the PI phase selections on corresponding PIs. The offset PI can be particularly useful for providing timing for a second sampling of the data for decoding the data and detecting phase mismatch between the data and the clock. The additional offset calculation can introduce an additional delay before the second output is available. The increased latency associated with the additional delay may have an adverse effect on system performance.

According to some implementations, the offset between CDRQ and CDRX can be a varying value that depends upon the particular application. For example, at a full-rate mode, the difference could be a default value such as 32—assuming the entire UI is divided into 64 units (e.g., half of the UI difference); while at sub-rate modes, the difference can be set to be zero, which has the real phase difference taken care of by the clock dividers in the down-stream. In some implementations, the CDR circuit offset also accounts for any asymmetry of the eye of the data signal and for other factors, such as clock network distortion. Thus, an extra offset can be added to the default value (e.g., 32 or 0) to indicate the asymmetry of the eye and the clock network distortion.

Figure 3:
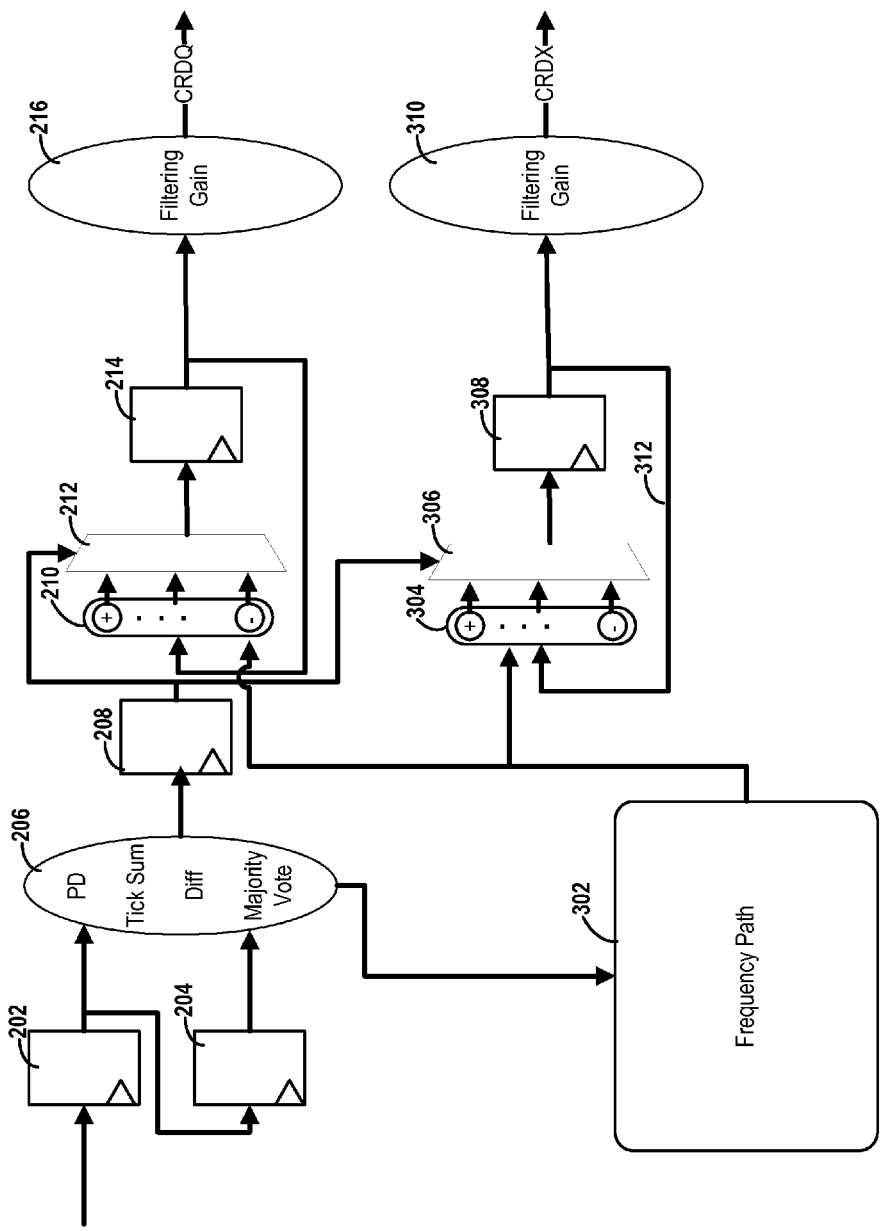
FIG. 3 depicts a block diagram for a CDR circuit with a speculative frequency path and with both speculative and parallel computations in a phase path, consistent with implementations of the present disclosure.

FIG. 3 depicts a block diagram for a CDR circuit with a speculative frequency path circuit and with both speculative and parallel computations in a phase path, consistent with implementations of the present disclosure. The phase path of FIG. 3 includes some of the similar components discussed in connection with FIG. 2 including: the data registers 202, 204, 208 and 214; phase detection circuit 206, speculative calculation circuit 210, selection circuit 212, and filtering and/or gain circuit 216. Moreover, the CDR circuit of FIG. 3 includes a second speculative calculation circuit 304 that is configured to calculate a second plurality of speculative phase selection signals that have an offset from the plurality of speculative phase selection signals generated by the speculative calculation circuit 210.

As discussed herein, the offset value can vary according to the particular application. Thus, speculative calculation circuit 304 can be configured with circuitry that allows for the offset portion of the calculation to be adjustable. A second selection circuit 306 can be configured to generate an output corresponding to a selected one of the second plurality of speculative phase selection signals. A data register 308 can store the second (offset) selected speculative phase selection signal, which can be used as a feedback 312 to the speculative calculation circuit 304 and provided as an output (CDRX). Filtering and/or gain circuit 310 can provide additional processing to the selected second speculative phase selection signal. The parallel computation of the speculative offset values allows for the calculation to be carried out before the first selected speculative phase selection signal is available. For example, the speculative calculation circuit 304 can calculate CRDX values corresponding to changes for each of increasing/moving-up (+), decreasing/moving-down (−), and no-change/no-move without prior knowledge of which change the first selected speculative phase selection signal will eventually indicate. The use of parallel computations in this manner can be particularly useful for reducing, or eliminating, timing delay relative to the calculation of the first selected speculative phase selection signal.

According to certain implementations, a frequency path circuit 302 can be integrated with the speculative portions of the CDR circuit. A frequency adjustment signal can be generated and provided to the speculative calculation circuits 210 and 304. In certain implementations, the frequency path can also include speculative calculations to reduce delays. Consistent with some implementations, the speculative calculation circuits can use an algorithm in which the current phase value stored in data registers 214 and 308 is calculated from the speculative phase adjustment values and frequency adjustment values by addition of the corresponding phase adjustment value and frequency adjustment values.

Figure 4:
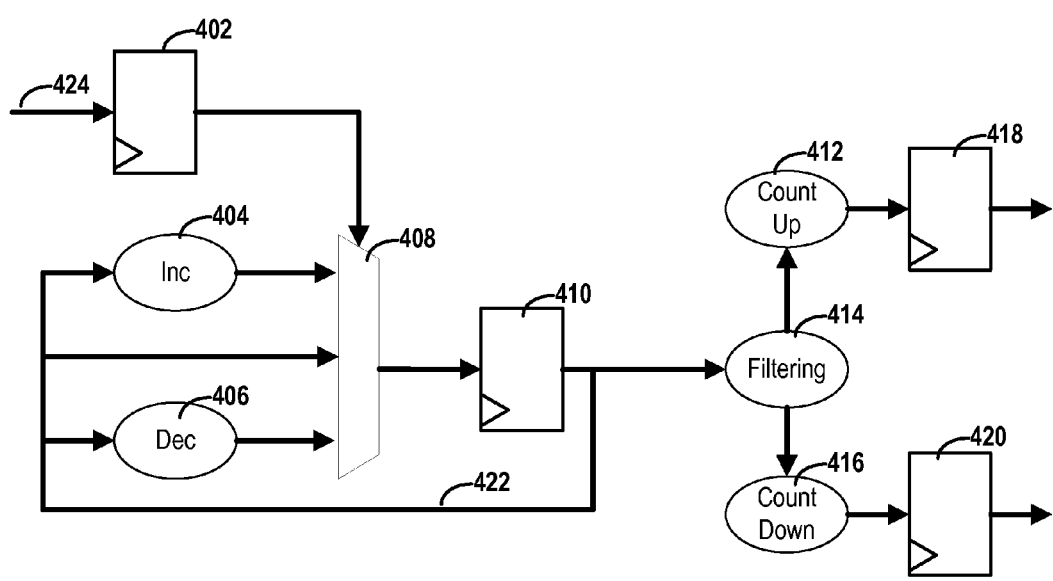
FIG. 4 depicts a block diagram for a speculative frequency path, consistent with implementations of the present disclosure.

FIG. 4 depicts a block diagram for a speculative frequency path circuit, consistent with implementations of the present disclosure. The speculative frequency path circuit can be configured to generate multiple speculative frequency signals, which can be selected using selection circuit 408. The selection can be made based upon the phase adjustment signal 424 from the phase path (e.g., as discussed in connection with FIG. 3), which can be stored in register 402. FIG. 4 depicts three possible selections: an increased frequency calculation circuit 404, a decreased frequency calculation circuit 406, and no adjustment. It is recognized that a more complex speculative frequency calculation solution could also be used (e.g., with multiple step up or down values).

The selected speculative frequency signal can be stored in register 410 and used as a feedback 422 to the frequency calculation circuits 406 and 404 and the selection circuit 408. Filtering circuit 414 can be used to suppress the contribution form the frequency path to the phase path (and to the overall system) since the phase path is considered to be the first order, and the frequency path the second order. The count-up circuit 412 and count-down circuit 416 are also speculative logic, which can be used to combine the contribution from the phase path directly and aim be useful for reducing the operation delay. The resulting frequency adjustment signal can then be stored in registers 418 and 420 and provided as an input to the speculative phase selection circuits and phase paths described herein. The speculation is possible since, in certain implementations, the majority voting scheme results in only three options: counting-up, counting-down and no-change, which are used in calculations for both the phase path and frequency path. Registers 418 and 420 store the speculative results of the feedback from the frequency path with phase path "counting-up" and "counting-down." This effectively moves the corresponding phase path additions to the frequency path, where the timing requirements of the frequency path contribution to the CDR can be less stringent than the requirements for the phase path contribution. For instance, the frequency path contribution provided by registers 418 and 420 can be based upon majority voting information from a previous CDR iteration, while the phase path contribution (e.g., selection of the calculations from 210 and 304), can be based upon majority voting information from the current CDR iteration. The speculative and integrated aspects of the frequency path can be particularly useful for reducing latency in the generation of the output of the CDR circuit.

Figure 5:
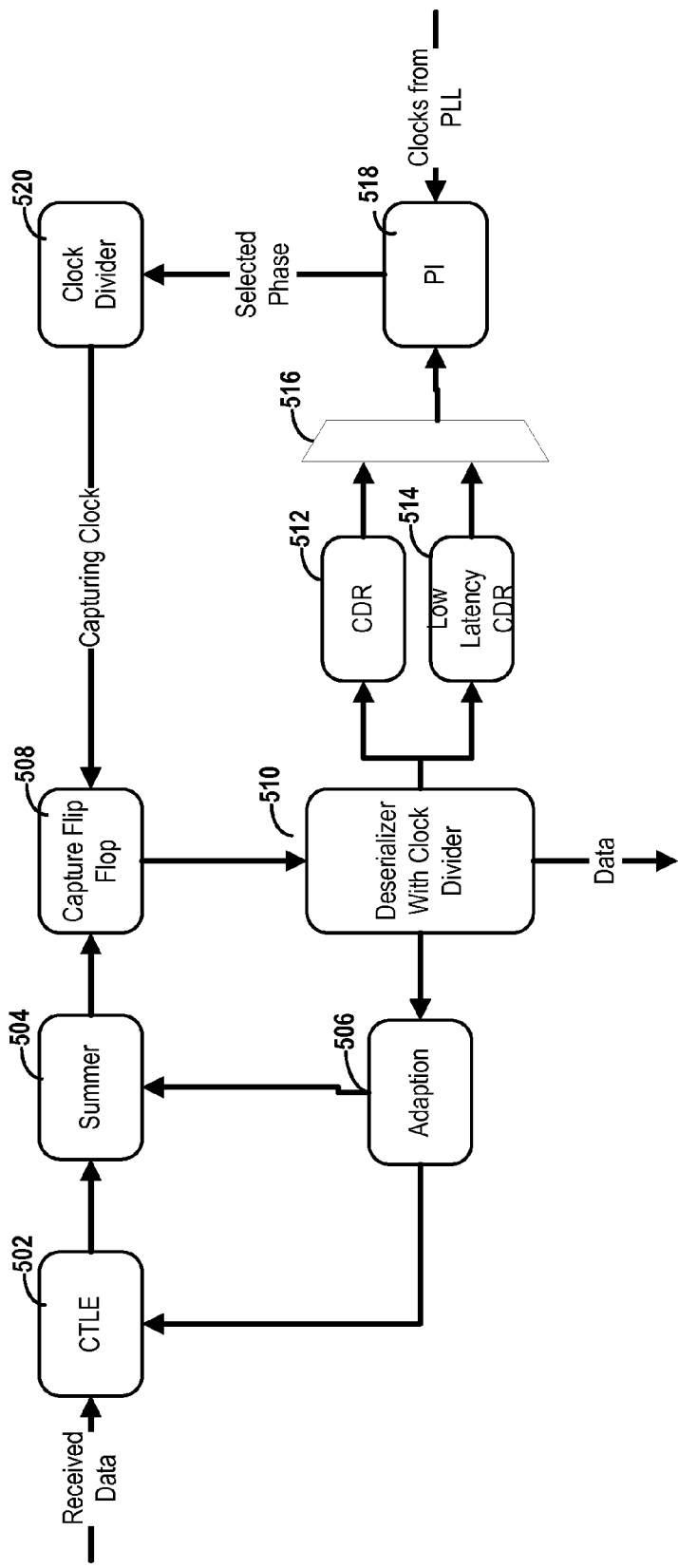
FIG. 5 depicts a system diagram for use with a CDR circuit, consistent with implementations of the present disclosure.

FIG. 5 depicts a system diagram for use with a CDR circuit, consistent with implementations of the present disclosure. A continuous time linear equalizer (CTLE) 502 can be used to compensate for distortion in the received data by producing an equalized data signal, based on feedback from adaptation circuit 506. Adaptation circuit 506 can generate the feedback based upon distortion that is detected based upon information from the decoded data. The feedback can be used to adjust parameters for the CTLE 502 and also to directly compensate the data using summer circuit 504.

Capture flip flop circuit 508 can store data captured from the equalized data signals based upon provided capture clocks. The stored data can be provided to a deserializer circuit 510 that generates output data by deserializing the data from the flip flop circuits using internal clock dividers. The deserializer circuit 510 can provide the data to the system for use therein.

As discussed herein, the capture clocks can be recovered from the received data. In certain implementations, the deserializer circuit 510 can provide the deserialized data and clock to two CDR circuits 512 and 514, either one of which can be enabled for any given implementation. The first CDR circuit 512 can use conventional CDR techniques to generate the PI codes for PI circuit 518, which uses the PI codes to control a clock divider circuit 520. The second CDR circuit 514 can use CDR techniques consistent with the low latency circuits and solutions discussed herein. CDR selection circuit 516 can be used to choose the appropriate CDR circuit. The selection can be made, in some instances, based upon the operational frequency of the application.

The deserialized parallel data to the CDR circuit 512 can fill the entire, or partial, data bus with different CDR operation clock frequencies. Each CDR operation cycle generates N-UI delay, where N represents the deserialization factor. The CDR operation for CDR circuit 512 can take a few cycles S to complete. The CDR total internal delay (latency) $\tau = S*N$, can become significant relative to the delays from other components in the system, and the CDR delay can have significant impact to the system performance. Thus, CDR circuit 514 can be selected to reduce the CDR operation cycles S with a reduced deserialization factor N (e.g., where N is reduced from five to two), which associates to a higher CDR operation frequency, when the CDR delay of CDR circuit 512 becomes a significant part of the system performance.

For example, measurements of existing silicon have shown that use of the CDR circuit 514 can improve the system jitter tolerance comparing with the other CDR circuit 512. In particular, the jitter tolerance curve for CDR circuit 512 dips at 10.5 MHz, which has the eye virtually closed. The CDR circuit 514 was shown to function at the same frequency with better tolerance. The reduced latency of the CDR circuit 514 can be particularly useful for PCI Express 3 or 4 (Peripheral Component Interconnect Express) applications, which can operate at frequencies in excess of 10 MHz.

Figure 6:
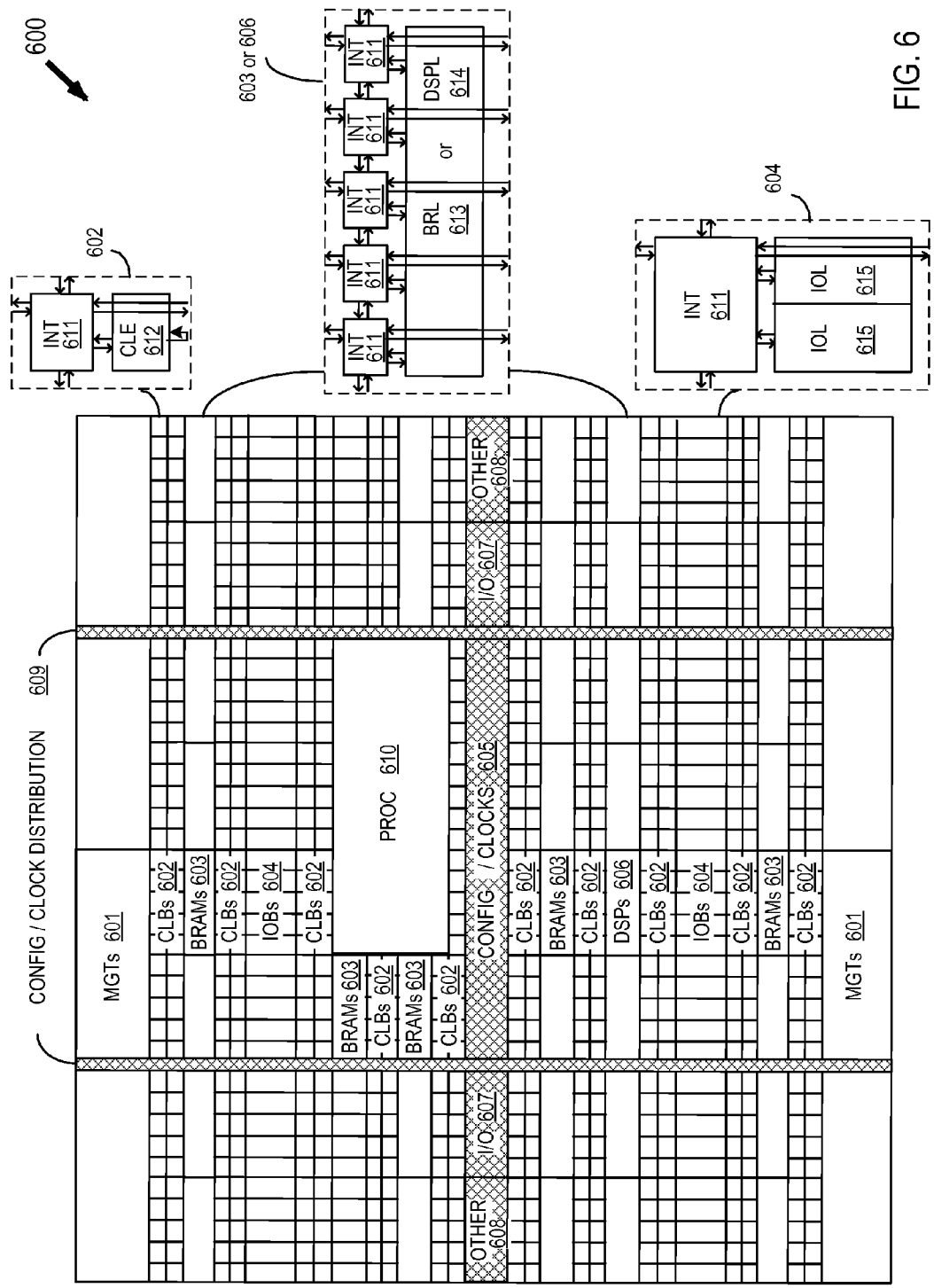
FIG. 6 shows a programmable integrated circuit (IC) 600 on which the disclosed circuits and processes may be implemented.

FIG. 6 shows a programmable integrated circuit (IC) 600 on which the disclosed circuits and processes may be implemented. The programmable IC may also be referred to as a System-on-Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. In some implementations the I/O can be configured to provide CDR functions, consistent with the circuits discussed here. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured implementation, a BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured implementation, a columnar area near the center of the die (shown shaded in FIG. 6) is used for configuration, clock, and other control logic. Horizontal areas 609 extending from the column are used to distribute the clock and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an example programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are merely an example. For example, in an actual programmable IC, more than one adjacent column of CLBs is typically included wherever the CLBs appear, to facilitate the efficient implementation of user logic.

Figure 7:
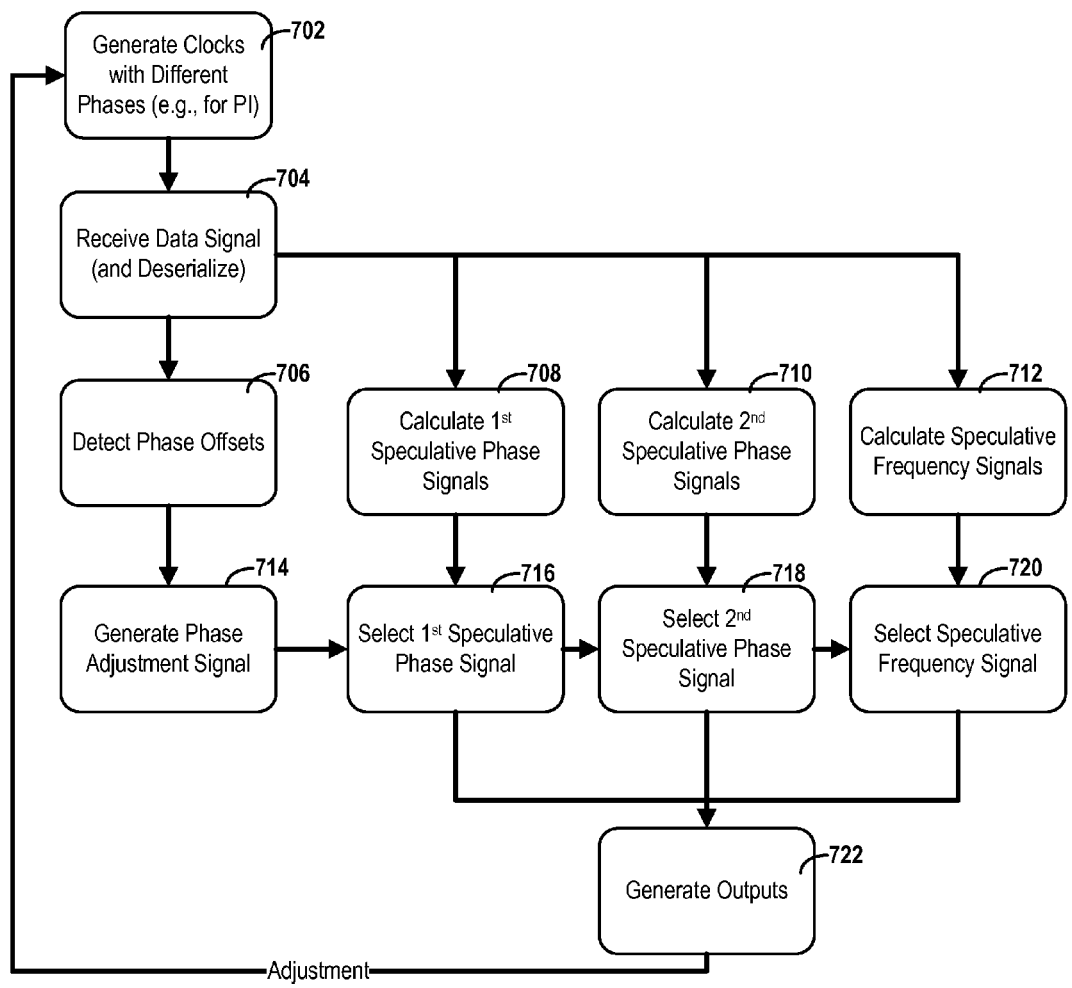
FIG. 7 depicts a flow chart for use with a CDR circuit, according to implementations of the present disclosure.

FIG. 7 depicts a flow chart for use with a CDR circuit, according to implementations of the present disclosure. A phase locked loop circuit can be configured to generate a plurality of clock signals each having a different relative phase offset, per block 702. The phase offset can be configured for use with a PI-based CDR circuit. A data signal, for use in recovering a corresponding clock of the transmitter, can be received by the CDR circuit, per block 704.

A phase detection circuit can then detect phase differences between the data signal and the plurality of clock signals, per block 706. Concurrently, or at least before the detection is completed, speculative phase signals can be calculated for two different paths, per blocks 708 and 710. As discussed herein, the second set of speculative phase signals can include a variable offset from the first set of speculative phase signals. In some implementations, a plurality of speculative frequency signals can also be generated in parallel to the detection of the phase offsets, per block 712.

Using the phase detection circuit, a phase adjustment signal is generated based upon a majority voting of the detected phase differences, per block 714. The phase adjustment signal can then be provided to respective selection circuits that select between a first speculative phase signal, a second speculative phase signal, and a frequency signal, per blocks 716, 718, and 720, respectively. Outputs can then be generated from the selected signals, per block 722.

Those skilled in the art will appreciate that various alternative computing arrangements, including one or more processors and a memory arrangement configured with program code, would be suitable for hosting the processes and data structures that may carry out functions disclosed herein (e.g., frequency determination and control functions). In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use CDR circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A clock data recovery device comprising:
   a phase path circuit that is configured to receive a data signal and a clock signal and that includes:
      a phase detection circuit configured to detect phase differences between the data signal and a plurality of clock signals and to generate a phase adjustment signal based upon a majority voting of the detected phase differences;

a first speculative calculation circuit configured to generate a first plurality of speculative phase selection signals for different potential values of the phase adjustment signal;

a second speculative calculation circuit configured to generate a second plurality of speculative phase selection signals that are offset from the first plurality of speculative phase selection signals and that are for the different potential values of the phase adjustment signal;

a first selection circuit configured to select, in response to the phase adjustment signal, one of the first plurality of speculative phase selection signals as a first output of the phase path circuit; and a second selection circuit configured to select, in response to the phase adjustment signal, one of the second plurality of speculative phase selection signals as a second output of the phase path circuit.

2. The device of claim 1, further comprising a frequency path circuit configured to generate a plurality of speculative frequency signals in parallel with the phase detection circuit.

3. The device of claim 2, wherein the frequency path circuit is further configured to provide a selected speculative frequency signal, of the plurality of speculative frequency signals, to each of the first and second speculative calculation circuits.

4. The device of claim 1, wherein the first output of the phase path circuit and the second output of the phase path circuit include phase interpolation (PI) codes that identify a respective clock signal of the plurality of clock signals.

5. The device of claim 1, wherein the first speculative calculation circuit is configured to generate a first plurality of speculative phase selection signals using a feedback signal.

6. The device of claim 5, wherein the feedback signal corresponds to a previously selected speculative phase selection signal.

7. The device of claim 1, wherein the device is configured to operate with data having a frequency in excess of 10 MHz.

8. The device of claim 1, wherein the device is configured for use with Peripheral Component Interconnect Express.

9. The device of claim 1, wherein the first speculative calculation circuit is configured to generate the first plurality of speculative phase selection signals based upon respective speculations that the phase adjustment signal will increase, decrease, or remain unchanged.

10. A method for clock data recovery, the method comprising:

generating a plurality of clock signals each having a different relative phase offset;

receiving a data signal;

detecting, using a phase detection circuit, phase differences between the data signal and the plurality of clock signals;

generating, using the phase detection circuit, a phase adjustment signal based upon a majority voting of the detected phase differences;

generating, using a first speculative calculation circuit, a first plurality of speculative phase selection signals for different potential values of the phase adjustment signal;

generating, using a second speculative calculation circuit, a second plurality of speculative phase selection signals that are offset from the first plurality of speculative phase selection signals and that are for the different potential values of the phase adjustment signal;

selecting, using a first selection circuit and in response to the phase adjustment signal, one of the first plurality of speculative phase selection signals as a first output of a phase path circuit; and selecting, using a second selection circuit and in response to the phase adjustment signal, one of the second plurality of speculative phase selection signals as a second output of the phase path circuit.

11. The method of claim 10, further comprising generating, using a frequency path circuit, a plurality of speculative frequency signals.

12. The method of claim 11, further comprising providing a selected frequency signal, from the plurality of speculative frequency signals, to each of the first and second speculative calculation circuits.

13. The method of claim 10, wherein the first output of the phase path circuit and the second output of the phase path circuit include phase interpolation (PI) codes that identify a respective clock signal of the plurality of clock signals.

14. The method of claim 10, further comprising providing a feedback signal to the first speculative calculation circuit.

15. The method of claim 14, wherein the feedback signal corresponds to a previously-selected speculative phase selection signal.

16. The method of claim 10, wherein the different potential values of the phase adjustment signal correspond to speculative phase speculations in which the phase adjustment signal is increased, a decreased, and not changed, respectively.

17. The method of claim 10, further comprising deserializing, prior to generating the phase adjustment signal, data from the data signal.

* * * * *